Jan. 24, 1933.  G. R. STEERE  1,895,297
WEIGHING MECHANISM ADAPTED FOR USE IN CHARGING MACHINES
Filed Sept. 13, 1928  2 Sheets-Sheet 2

GEORGE R. STEERE
INVENTOR

BY Forbes Silsby
ATTORNEY

Patented Jan. 24, 1933

1,895,297

UNITED STATES PATENT OFFICE

GEORGE R. STEERE, OF OWOSSO, MICHIGAN, ASSIGNOR TO SEMET-SOLVAY ENGINEERING CORPORATION, OF NEW YORK, N. Y., A CORPORATION OF NEW YORK

WEIGHING MECHANISM ADAPTED FOR USE IN CHARGING MACHINES

Application filed September 13, 1928. Serial No. 305,849.

This invention relates to a device for receiving and delivering material to a container, and more particularly to a balance or scale and to a fuel feeding device for a charging machine preferably including such a balance as disclosed for example in the patent to George R. Steere No. 1,608,680 of November 30, 1926. While I have shown and described as a preferred embodiment of my invention a fuel feeding device for a charging machine of a gas generator, it will be understood that this invention is not limited thereto but may be used in connection with any balance or other device for receiving and delivering material.

One object of the present invention is to provide a counter-balance adapted for use in a charging machine that is of simple and rugged construction and efficient in operation. Another object is to provide a scale or balance with control means whereby the feed of material to the hopper or scale pan of the balance is interrupted upon the delivery of a predetermined amount of material thereto and the feed of such material is maintained inoperative while the hopper is in discharge position, and is initiated when the hopper returns into position to receive a further charge.

According to a preferred embodiment of this invention, there is provided a hopper or other container loosely and rotatably mounted on the reduced ends of a shaft supported in bearings, these ends being eccentrically disposed with respect to the intermediate portion of the shaft. Pinned or otherwise secured to the intermediate portion of this shaft is one end of a weight lever, the other end of which has a weight arm carrying a weight platform arranged to detachably receive suitable weights.

There is thus provided a counter-balance of rugged and simple construction operating on the principle of a lever of the first kind with unequal arms. The distance between the center line of the intermediate portion of the shaft and the end of the weight lever carrying the weight arm represents the long arm, the distance between the center line of the intermediate portion of the shaft and the center line of the reduced eccentric end portions represents the short arm and the center line of the intermediate portion of the shaft serves as the fulcrum of the lever.

The invention also includes a conveyor driven by an electric motor to deliver the desired material to the hopper. This motor is connected in series with two switches, one on the weight lever and the other on the hopper. Pivotal movement of the weight lever caused by the delivery of a predetermined charge, opens the switch on the lever interrupting the circuit and thus automatically discontinues the operation of the conveyor, i. e., feeding material to the hopper or other container. The hopper in moving to discharge or unloading position causes the switch thereon to open so that when the load or charge is fed from the hopper and the weight lever moves back to normal, i. e., empty position, the switch on the weight lever closes and the switch on the hopper remains open. Due to the open switch on the hopper, the conveyor is not started in operation and material not fed thereby. Upon return of the hopper into material receiving position, the switch thereon is closed and since both switches are closed when the hopper is empty and in material receiving position, the motor is energized and drives the conveyor to feed material to the hopper.

This invention accordingly comprises a movable hopper arranged to receive material fed thereto and provided with mechanism to interrupt the delivery of material thereto and to maintain the material feeding means inoperative while the hopper is not in position to receive a charge.

Other objects and advantages will appear from the following detailed description taken in connection with the accompanying drawings in which Fig. 1 is a fragmentary side elevation, partly in section, of a charging machine and showing a portion of the top of the generator, the hopper of the charging machine, a portion of the hopper being broken away to depict the interior construction thereof and illustrating a preferred embodiment of my invention;

Figure 1:
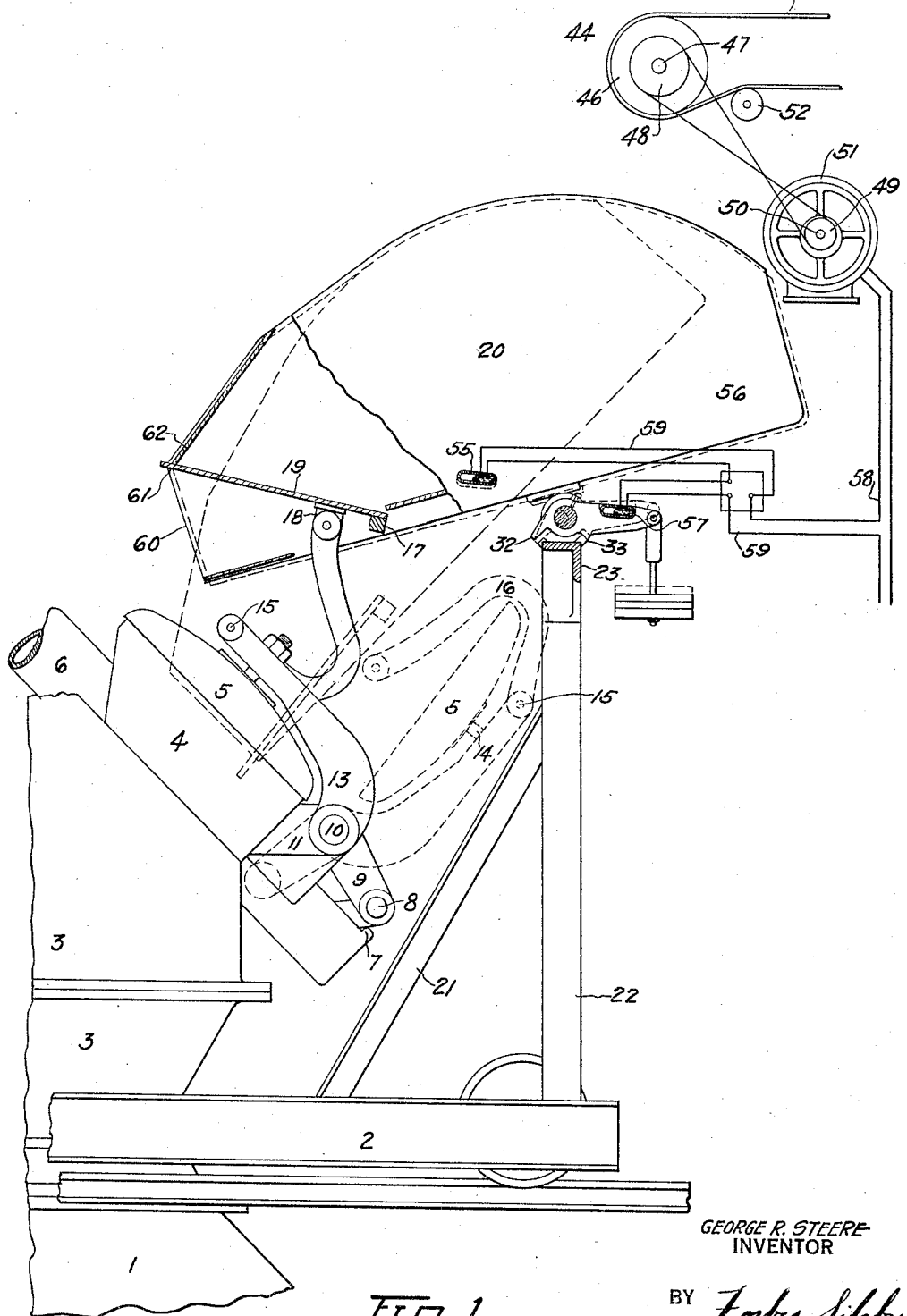

Referring to the drawings wherein 1 indicates the top portion of a combustible gas generating machine such as a water gas generator, 2 indicates the frame of a charging machine, preferably such as disclosed in the Steere patent hereinbefore mentioned, in charging position over the charging opening of the generator 1. The charging machine comprises a magazine 3 fragmentarily shown provided with a fuel nozzle 4 having a cover 5 adapted to serve as a closure for the nozzle 4. The cover 5 is moved into open and closed positions by a hydraulic motor or cylinder 6 through link 7 bolted or otherwise secured to the piston rod (not shown) of the cylinder 6. Link 7 is pivoted at 8 to a lever 9 which is keyed or otherwise fastened to shaft 10 supported in brackets 11 secured to the charging machine. A lever 13 is keyed to shaft 10 and has integrally formed therewith or secured thereto a pin 14 which is mounted on the cover 5. Pivoted at 15 to the lever 13 is a curved lever 16 which is in turn pivoted to a bracket 18 fastened to a gate or flapper 19 pivoted at 17 in the sides of a hopper 20.

Figure 3:
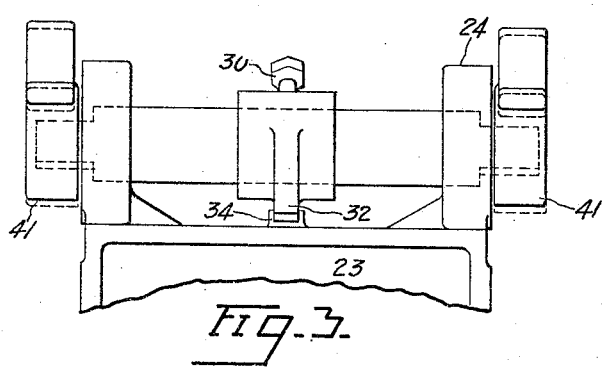
Fig. 3 is a fragmentary front elevational detail showing the mounting for the hopper and weight lever.
Figure 4:
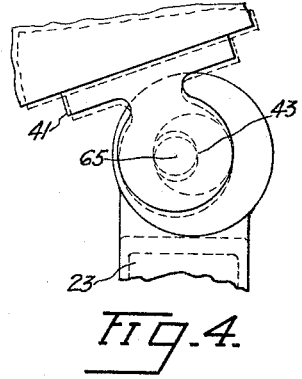
Fig. 4 is a side elevational detail showing the mounting for the hopper.
Figure 5:
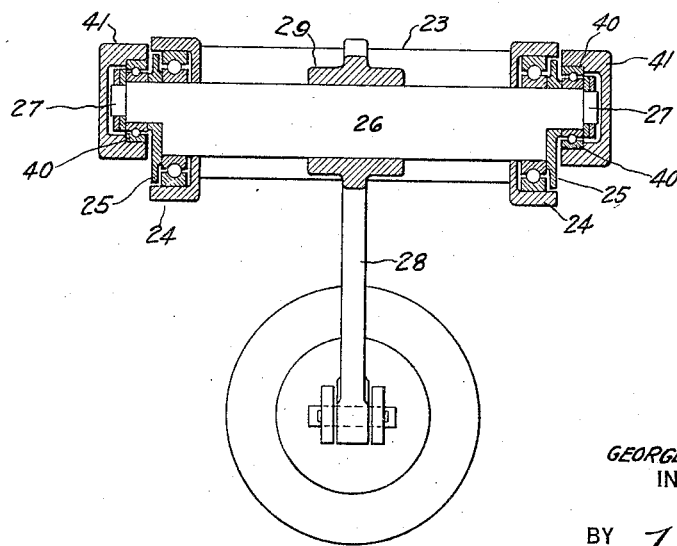
Fig. 5 is a plan view partly in section taken on the line 5—5 of Fig. 2.

Standards 22 braced by struts 21 are bolted or otherwise secured to the frame 2 of the charging machine and are provided at the top with a cros-bar 23. Bearing housings 24 (Fig. 5) are preferably formed integral with the end portions of the cross-bar 23 and have mounted therein ball bearings 25. Loosely and rotatably journaled in the ball bearings 25 is a cylindrical shaft 26 which has preferably formed integral therewith reduced eccentric end portions 27. A weight lever 28 has at one end a collar 29 which is mounted on the intermediate portion of the shaft 26 and is adjustably secured thereto by bolt 30 (Figs. 3 and 4) threadedly mounted in opening 31. By loosening bolt 30 in opening 31 so that it does not contact with shaft 26, collar 29 and the weight lever 28 may be suitably positioned with respect to the circumferential surface of the shaft. The collar 29 has preferably formed integral therewith lugs 32, 33 which are arranged to contact with projections 34 formed on the cross-bar 23 thereby limiting the rotary or rocking movement of the collar and weight lever. Pivotally fastened to the end 36 of the weight lever 28 is a weight arm 37 which carries a weight platform 38 adapted to detachably receive suitable weights.

The eccentric ends 27 of the shaft 26 are mounted in ball bearings 40. Loosely and rotatably mounted on the ball bearings 40 are supporting arms 41, integral with or secured to the base or side portions of the hopper 20. The hopper 20 and supporting arms 41 are so positioned and balanced on the shaft 26 that the rear portion of the hopper is maintained in horizontal position and a charge of material is required to cause the hopper to pivot downwardly about the ball bearing mounting 40. Also the hopper and supporting arms 41 counterbalance the weight lever 28, weight arm 37 and weight platform 38 about the center line 43 of the shaft 26. It will be noted that the center line 43 of the shaft 26 thus serves as the fulcrum for the balance.

A conveyor 44 (Fig. 1) is suitably positioned to deliver material such as fuel to the hopper 20 of the charging machine. The conveyor belt 45 passes over a pulley 46 keyed or otherwise secured to a shaft 47 suitably journaled above the hopper 20. Shaft 47 has secured thereto a drive pulley 48 which is belted to a pulley 49 keyed to the armature shaft 50 of a motor 51. A usual belt tension device 52 is provided for maintaining the conveyor belt 45 taut.

A mercury switch 55 is mounted on a side 56 of the hopper 20 and a second mercury switch 57 is mounted on the weight lever 28. The mercury switches 55 and 57 are connected in series with the motor circuit 58 for the motor 51 by electric conductors 59. The circuit 58 is connected to a suitable source of power.

Figure 2:
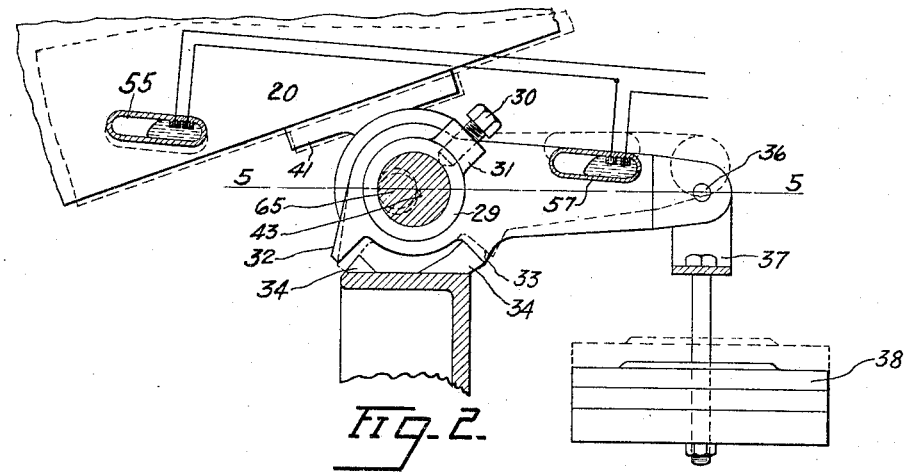
Fig. 2 is a fragmentary side elevational detail partly in section showing the mounting for the hopper and weight lever.

In operation, when a predetermined charge has been delivered to the hopper 20 in full line position (Fig. 1) which is the position for receiving the charge from the conveyor 44, the hopper and the charge overbalances the weight lever, weight platform and weights on the latter. Accordingly, shaft 26 is rocked, movement thereof being limited by the lug 32 contacting with projection 34, the hopper descending and the weight lever moving upwardly, as shown from the full to the dotted line positions (Figs. 1 and 2). The elevation of the weight lever 28 causes the mercury in switch 57 to flow toward the left thereby opening this switch and the circuit to the motor thus de-energizing and stopping the motor and consequently interrupting the feed of material by the conveyor 44 to the hopper 20.

At substantially the same time as the hopper descends, it also pivots about the ball bearing mounting 40 lowering the discharge end 60 into discharge position. Simultaneously with this pivotal movement the hydraulic cylinder or motor 6 operates the levers 7, 9 and 13 to open the cover 5. As the hopper moves into the dotted line position (Fig. 1) discharge position, the cover moves toward the open position shown in dotted lines (Fig. 1) so that the curved lever 16 moves backward as the gate 19 and hopper 20 descend and as there is no relative movement between lever 16 and gate 19, the gate is maintained in closed position. When the hopper moves into the fuel nozzle 4 further movement of the cover toward the right (Fig. 1) causes lever 16 to swing the gate 19 about the pivot 17 permitting the fuel to flow into the magazine 3. Movement of the cover 5 into closed position first causes curved lever 16 to swing the gate 19 into position so that the end 61 of gate 19 engages the top stop 62 integral with or secured to the sides of the magazine and continued movement of the cover swings the hopper about ends 27 of shaft 26 into full line loading position (Fig. 1).

The above described downward movement of hopper 20 causes the mercury in switch 55 to flow toward the left (Figs. 1 and 2) thereby opening switch 55. Accordingly, when the fuel is discharged from the hopper 20 and lever 28 moves back to full line position (Fig. 1) closing the switch 57, the motor 51 is not energized as the circuit due to open switch 55 remains open. The return of the hopper into fuel receiving position closes the switch 55 which completes the circuit to the electric motor 51 energizing the motor which drives conveyor belt 45 through the pulleys 48, 49 and connecting belt, and an additional charge is thus fed to hopper 20.

It will be noted that there is provided a counter-balance of rugged and simple construction which operates on the principle of a lever of the first kind with unequal arms. The distance between the center line 43 and the point where the weight arm 37 is secured to weight lever 28 represents the long arm, the distance between the center line 43 and the center line 65 of the eccentric ends 27 of the shaft 26 represents the short arm, and the center line 43 of shaft 26 serves as the fulcrum for this lever.

It will also be noted that while the hopper 20 is in discharge position, switch 55 prevents energization of motor 51 and the feed by the conveyor 45 to the hopper 20 thereby maintaining the conveyor in non-feeding position while the hopper is not in position to receive further charges.

It will of course be understood that while a specific embodiment of the invention is shown and described, various changes in the details thereof may be made by those skilled in the art and the invention is not to be limited to the structure disclosed but only by the scope of the appended claims.

What is claimed is:

1. In combination, a hopper movable from a position to receive a charge to a different position to discharge said charge, means for delivering a charge to said hopper, means for interrupting the operation of said delivery means, means for moving said hopper from a position to discharge the charge to a position to receive a further charge, and means for maintaining the delivery means inoperative while the hopper is in discharge position and for initiating the delivery of a further charge to said hopper upon its movement into position to receive a further charge.

2. In combination, a movable hopper, means for delivering a charge to said hopper, the delivery of said charge to said hopper causing movement of said hopper from charge-receiving to charge-discharging position, movement of said hopper functioning to interrupt the operation of said delivery means, means for maintaining the delivery means inoperative while the hopper is not in position to receive a further charge, and means for returning said hopper and simultaneously initiating the delivery of a further charge to said hopper.

3. In a balance, a hopper movable from a position to receive a charge to a different position to discharge said charge, a switch on said hopper, a weight lever counter-balancing said hopper, a switch on said weight lever, a conveyor arranged to deliver a charge to said hopper, delivery of said charge causing said hopper to move to discharge position and open said switch on said hopper and said switch on said weight lever, discharge of said charge causing the switch on said weight lever to close while the switch on said hopper remains open, means for returning the hopper to charge-receiving position, return of said hopper to charge-receiving position causing said switch on said hopper to close, and an electric motor for driving said conveyor connected in series with said switches.

4. In a balance, bearing supports, a shaft having the end portions eccentrically positioned with respect to the intermediate portion mounted in said supports, a hopper on the eccentric ends and a weight lever on the intermediate portion of said shaft positioned so as to provide a lever of the first kind, with unequal arms, the weight lever representing the long arm, and the distance between the center line of the intermediate portion and the center line of the eccentric ends representing the short arm.

5. In a balance, bearing supports, a shaft having the end portions eccentrically positioned with respect to the intermediate portion mounted in said supports, a hopper rotatably mounted on the end portions of said shaft, and a weight lever secured to the intermediate portion of said shaft.

6. In a balance, bearing supports, a cylindrical shaft having the end portions reduced in diameter, eccentrically disposed with respect to the intermediate portion of said shaft, and positioned at one side of the center line of said shaft, a weight lever secured to said intermediate portion extending longitudinally away from said eccentric ends and disposed on the opposite side of the center line of said shaft, and a hopper rotatably mounted on the eccentric end portions.

7. In a charging machine, bearing supports, a shaft having the end portions eccentrically positioned with respect to the intermediate portion mounted in said supports, a hopper rotatably mounted on the end portions of said shaft, a switch on said hopper, a weight lever secured to the intermediate portion of said shaft in counter-balance relation to said hopper, and a second switch on said weight lever connected in series with the switch on said hopper.

8. In a charging machine, bearing supports, a cylindrical shaft having the end portions reduced in diameter and eccentrically disposed with respect to the intermediate portion of said shaft, a weight lever secured to said intermediate portion, a switch on said weight lever, a hopper rotatably mounted on the eccentric end portions, a switch on said hopper, a conveyor for delivering a charge to said hopper, and an electric motor for driving said conveyor, said electric motor being connected in series with said switches.

9. In a charging machine for a gas generator in combination, bearing supports, a circular shaft mounted in said supports having end projections eccentrically positioned on said shaft, a weight lever secured to the intermediate portion of said shaft, supporting arms rotatably mounted on the eccentric ends of said shaft, a hopper secured to said supporting arms in counter-balance relation to said weight lever, a closure plate for said hopper having a lever extending therefrom and pivotally connected to said lever connected to said cover, mercury switches located on said weight lever and said hopper, a conveyor for delivering a charge to said hopper and a motor for driving said conveyor connected in series with said switches.

In witness whereof I hereunto set my hand.

GEORGE R. STEERE.